(12) United States Patent
Bao et al.

(10) Patent No.: US 11,021,913 B2
(45) Date of Patent: Jun. 1, 2021

(54) DIRECT CASTING OF ULTRAHARD INSERT IN BIT BODY

(71) Applicant: Smith International, Inc., Houston, TX (US)

(72) Inventors: Yahua Bao, Orem, UT (US); John Daniel Belnap, Lindon, UT (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 16/061,680

(22) PCT Filed: Dec. 14, 2016

(86) PCT No.: PCT/US2016/066730
§ 371 (c)(1),
(2) Date: Jun. 13, 2018

(87) PCT Pub. No.: WO2017/106388
PCT Pub. Date: Jun. 22, 2017

(65) Prior Publication Data
US 2018/0371844 A1    Dec. 27, 2018

Related U.S. Application Data

(60) Provisional application No. 62/267,262, filed on Dec. 14, 2015.

(51) Int. Cl.
*E21B 10/42* (2006.01)
*E21B 10/48* (2006.01)
(Continued)

(52) U.S. Cl.
CPC ............. *E21B 10/55* (2013.01); *E21B 10/42* (2013.01); *E21B 10/485* (2013.01); *E21B 10/54* (2013.01);
(Continued)

(58) Field of Classification Search
CPC ........ E21B 10/42; E21B 10/485; E21B 10/54; E21B 10/55; E21B 10/5676; E21B 10/573; E21B 10/58
See application file for complete search history.

(56) References Cited

U.S. PATENT DOCUMENTS

RE25,684 E    11/1964  Coulter
4,440,246 A    4/1984  Jurgens
(Continued)

FOREIGN PATENT DOCUMENTS

CN    101153363 A    4/2008
CN    204225772      4/2008
(Continued)

OTHER PUBLICATIONS

International Preliminary Report on Patentability issued in related International Patent application PCT/US2016/066701, dated Jun. 28, 2018, 14 pages.
(Continued)

*Primary Examiner* — Matthew R Buck (57) ABSTRACT

A cutting bit includes a body, a plurality of blades, and at least one ultrahard insert cast directly into at least one of the plurality of blades. The ultrahard insert is positioned with a rear face directly contacting the blade.

13 Claims, 8 Drawing Sheets

(51) Int. Cl.
*E21B 10/54* (2006.01)
*E21B 10/55* (2006.01)
*E21B 10/567* (2006.01)
*E21B 10/573* (2006.01)
*E21B 10/58* (2006.01)
*B23P 15/28* (2006.01)

(52) U.S. Cl.
CPC ........ *E21B 10/5676* (2013.01); *E21B 10/573* (2013.01); *E21B 10/58* (2013.01); *B23P 15/28* (2013.01)

(56) References Cited

U.S. PATENT DOCUMENTS

| | | | |
|---|---|---|---|
| 4,453,605 A | | 6/1984 | Short, Jr. |
| 4,624,830 A | * | 11/1986 | Barr ........................... B22F 7/06 419/7 |
| 4,646,857 A | * | 3/1987 | Thompson .......... E21B 10/5735 175/430 |
| 4,667,756 A | | 5/1987 | King et al. |
| 4,858,706 A | | 8/1989 | Lebourgh |
| 5,007,493 A | * | 4/1991 | Coolidge ................ E21B 10/55 175/432 |
| 5,025,873 A | * | 6/1991 | Cerkovnik ............ E21B 10/567 175/379 |
| 5,248,006 A | | 9/1993 | Scott et al. |
| 5,282,513 A | * | 2/1994 | Jones ........................ B23P 5/00 175/393 |
| 5,348,108 A | | 9/1994 | Scott et al. |
| 5,447,208 A | | 9/1995 | Lund et al. |
| 5,487,436 A | | 1/1996 | Griffin |
| 5,819,862 A | | 10/1998 | Matthias et al. |
| 5,944,129 A | | 8/1999 | Jensen |
| 6,248,447 B1 | * | 6/2001 | Griffin ................... C04B 37/021 175/434 |
| 6,269,894 B1 | | 8/2001 | Griffin |
| 6,290,008 B1 | | 9/2001 | Portwood et al. |
| 6,742,611 B1 | * | 6/2004 | Illerhaus ............. E21B 10/5735 175/433 |
| 7,426,969 B2 | * | 9/2008 | Azar ..................... E21B 10/567 175/426 |
| 7,971,663 B1 | | 7/2011 | Vail |
| 8,083,012 B2 | | 12/2011 | Voronin et al. |
| 8,157,029 B2 | | 4/2012 | Zhang et al. |
| 8,177,001 B2 | | 5/2012 | McClain et al. |
| 8,191,654 B2 | | 6/2012 | McClain et al. |
| 8,261,858 B1 | | 9/2012 | Atkins et al. |
| 8,336,648 B1 | * | 12/2012 | Weaver ............... E21B 10/5735 175/412 |
| 8,349,040 B2 | | 1/2013 | Bellin |
| 8,567,534 B2 | | 10/2013 | Zhang et al. |
| 8,579,053 B2 | | 11/2013 | Bellin et al. |
| 8,943,663 B2 | * | 2/2015 | Overstreet .............. E21B 10/43 29/458 |
| 9,068,408 B2 | * | 6/2015 | Vempati ................. E21B 10/43 |
| 9,097,075 B2 | | 8/2015 | Lin |
| 10,024,112 B2 | | 7/2018 | Nilen et al. |
| 10,060,192 B1 | | 8/2018 | Miess et al. |
| 10,071,355 B2 | | 9/2018 | Olofsson et al. |
| 10,316,592 B2 | * | 6/2019 | Chen ................... E21B 10/5673 |
| 10,745,973 B2 | | 8/2020 | Grosz et al. |
| 2002/0077054 A1 | | 6/2002 | Sung |
| 2002/0084112 A1 | | 7/2002 | Hall et al. |
| 2003/0037640 A1 | | 2/2003 | Griffin et al. |
| 2005/0133276 A1 | | 6/2005 | Azar |
| 2005/0230150 A1 | | 10/2005 | Oldham et al. |
| 2007/0023206 A1 | | 2/2007 | Keshavan et al. |
| 2007/0089913 A1 | | 4/2007 | Desai et al. |
| 2007/0199739 A1 | | 8/2007 | Schwefe et al. |
| 2008/0142276 A1 | | 6/2008 | Griffo et al. |
| 2008/0230279 A1 | | 9/2008 | Bitler et al. |
| 2008/0236900 A1 | | 10/2008 | Cooley et al. |
| 2008/0296070 A1 | * | 12/2008 | Shen ................... E21B 10/5673 175/421 |
| 2009/0178855 A1 | | 7/2009 | Zhang et al. |
| 2009/0183925 A1 | | 7/2009 | Azar et al. |
| 2010/0012389 A1 | | 1/2010 | Zhang et al. |
| 2010/0025113 A1 | | 2/2010 | Warren et al. |
| 2010/0025114 A1 | | 2/2010 | Brady |
| 2010/0206941 A1 | | 8/2010 | Egan et al. |
| 2010/0288563 A1 | | 11/2010 | Smith |
| 2010/0314176 A1 | | 12/2010 | Zhang et al. |
| 2010/0320005 A1 | | 12/2010 | Burhan et al. |
| 2011/0061942 A1 | | 3/2011 | Digiovanni |
| 2011/0083909 A1 | | 4/2011 | Shen et al. |
| 2011/0174549 A1 | | 7/2011 | Dolan et al. |
| 2012/0024604 A1 | * | 2/2012 | Hoffmaster ............. E21B 10/43 175/57 |
| 2012/0080239 A1 | | 4/2012 | Lyons et al. |
| 2013/0112485 A1 | | 5/2013 | Richert et al. |
| 2014/0087640 A1 | | 3/2014 | Morozov et al. |
| 2014/0238753 A1 | | 8/2014 | Nelms et al. |
| 2015/0165591 A1 | | 6/2015 | Can et al. |

FOREIGN PATENT DOCUMENTS

| | | |
|---|---|---|
| EP | 291314 A2 | 11/1988 |
| EP | 0437855 A2 | 7/1991 |
| WO | WO2005061745 A2 | 7/2005 |
| WO | 2007148060 A1 | 12/2007 |
| WO | WO2011089125 A2 | 7/2011 |
| WO | WO2011144670 A1 | 11/2011 |
| WO | WO2012025516 A2 | 3/2012 |
| WO | WO2012170970 A2 | 12/2012 |
| WO | WO2017106373 A1 | 6/2017 |
| WO | WO2017106374 A1 | 6/2017 |

OTHER PUBLICATIONS

International Preliminary Report on Patentability issued in related International Patent application PCT/US2016/066704, dated Jun. 28, 2018, 12 pages.
International Preliminary Report on Patentability issued in related International Patent application PCT/US2016/066730, dated Jun. 28, 2018, 7 pages.
International Search Report and Written Opinion issued in International Patent application PCT/US2016/066701 dated Apr. 4, 2017. 16 pages.
International Search Report and Written Opinion issued in International Patent application PCT/US2016/066704 dated Mar. 27, 2017. 15 pages.
International Search Report and Written Opinion issued in International Patent application PCT/US2016/066730 dated Apr. 6, 2017. 10 pages.
Plemons et al., New cutter technology for faster drilling in hard/abrasive formations. SPE 132143-MS. COS/SPE International Oil and Gas Conference and Exhibition in China, Jun. 8-10, 2010, Beijing, China. Society of Petroleum Engineers 10 pages.
Westraadt et al., Thermally stable polycrystalline diamond sintered with calcium carbonate. Diamond and Related Materials vol. 16, Issue 11, Nov. 2007, pp. 1929-1935.
Boland et al., Microstructural characterisation and wear behaviour of diamond composite materials. CSIRO Exploration and Mining, PO Box 883, Kenmore QLD 4069, Australia Materials 2010, 3(2), 1390-1419. Published Feb. 24, 2010. 30 pages.
Radtke et al., Thermally stable polycrystalline diamond cutters for drill bits. SPE-90845. SPE Annual Technical conference and Exhibition, Sep. 26-29, 2004, Houston, Texas. 6 pages.
Sneedon et al., Polycrystalline diamond: manufacture, wear mechanisms, and implications for bit design. Journal of Petroleum Technology vol. 40, No. 12 pp. 1593-1601 Dec. 1988. 9 pages.
Bellin et al., The current state of PDC bit technology Part 3 of 3: Improvements in material properties and testing methods are being pursued to make PDC the cutter of choice for an increasing variety of applications. World Oil, Nov. 2010 issue, pp. 67-71.
Office Action issued in U.S. Appl. No. 16/061,669 dated Apr. 5, 2019, 9 pages.

(56) References Cited

OTHER PUBLICATIONS

Office Action issued in U.S. Appl. No. 16/061,694 dated Mar. 29, 2019, 10 pages.
First Office Action and Search Report issued in Chinese Patent Application No. 201680074980.7 dated Jul. 18, 2019, 16 pages.
First Office Action and Search Report issued in Chinese patent application 201680073227.6 dated Aug. 2, 2019, 8 pages.
First Office Action and Search Report issued in Chinese patent application 201680073209.8 dated Aug. 5, 2019, 11 pages.
Office Action issued in U.S. Appl. No. 16/061,694 dated Sep. 4, 2019, 8 pages.
Office Action issued in U.S. Appl. No. 16/061,694 dated Dec. 9, 2019, 8 pages.
Office Action issued in U.S. Appl. No. 16/061,669 dated Oct. 21, 2019, 11 pages.
Advisory Action issued in U.S. Appl. No. 16/061,669 dated Jan. 10, 2020, 5 pages.
Office Action received in U.S. Appl. No. 16/061,669 dated May 1, 2020, 10 pages.
Office Action received in U.S. Appl. No. 16/061,694 dated May 11, 2020, 7 pages.
Second Office Action and Search Report issued in Chinese Patent Application No. 201680074980.7 dated Jul. 3, 2020, 17 pages.
Second Office Action and Search Report issued in Chinese Patent Application No. 201680073209.8 dated Apr. 13, 2020, 19 pages.
Second Office Action and Search Report issued in Chinese Patent Application No. 201680073227.6 dated Apr. 2, 2020, 12 pages.
Office Action received in U.S. Appl. No. 16/061,669 dated Sep. 4, 2020, 11 pages.
Decision of Rejection received in Chinese Patent Application No. 201680073227.6 dated Sep. 2, 2002, 8 pages with English translation.
Third Office Action and Search Report issued in Chinese Patent Application No. 201680073209.8 dated Nov. 6, 2020, 23 pages with English Translation.
Third Office Action and Search Report issued in Chinese Patent Application No. 201680074980.7 dated Dec. 22, 2020, 14 pages with English Translation.

\* cited by examiner

DIRECT CASTING OF ULTRAHARD INSERT IN BIT BODY

BACKGROUND OF THE DISCLOSURE

Downhole systems may be used to drill, service, or perform other operations on a wellbore in a surface location or a seabed for a variety of exploratory or extraction purposes. For example, a wellbore may be drilled to access valuable subterranean resources, such as liquid and gaseous hydrocarbons and solid minerals, stored in subterranean formations and to extract the resources from the formations. In addition, there are other applications which require drilling of subterranean formations including boring for geothermal, water well, communications, or mining applications— including blast hole drilling and roof bolting.

Drilling systems are conventionally used to remove material from earth formations and other material, such as concrete, through mechanical removal of material. Drag bits, roller cone bits, reciprocating bits, and other mechanical bits fracture, pulverize, break, or otherwise remove material through the direct application of force. Different formations remove different amounts of force to remove material. Increasing the amount of mechanical force applied to the formation includes increasing the torque and weight on bit on the drilling system, both of which introduce additional challenges upon increases.

Conventional mechanical bits use cutting elements brazed into a bit body. The cutting elements include polycrystalline diamond (PCD) affixed to or in a carbide matrix. Brazing conventional cutting elements into the bit body can damage the cutting element and fixation methods used to attach the PCD to the matrix increase manufacturing complexity and cost.

SUMMARY

In some embodiments, a device for removing material includes a bit body having a plurality of blades and at least one ultrahard insert cast directly into at least one blade of the plurality of blades. The ultrahard insert has a rear face directly contacting the at least one blade.

In other embodiments, a device for removing material includes a bit body, a first polycrystalline diamond (PCD) insert, and a second PCD insert. The bit body has a plurality of blades and a rotational axis. The first PCD insert is cast directly into a first row of a first blade of the plurality of blades. The second PCD insert is cast directly into a second row of the first blade of the plurality of blades. The second row is positioned behind the first row relative to a direction of rotation of the bit body about the rotational axis.

In yet other embodiments, a method for manufacturing a bit includes forming a PCD insert, positioning a rear surface of the PCD insert in contact with a precursor material in a bit mold, and curing the precursor material at a curing temperature not higher than 2200° Fahrenheit (1204° Celsius) to form a bit body and at least one blade.

This summary is provided to introduce a selection of concepts that are further described below in the detailed description. This summary is not intended to identify key or essential features of the claimed subject matter, nor is it intended to be used as an aid in limiting the scope of the claimed subject matter.

Additional features of embodiments of the disclosure will be set forth in the description which follows, and in part will be obvious from the description, or may be learned by the practice of such embodiments. The features of such embodiments may be realized and obtained by means of the instruments and combinations particularly pointed out in the appended claims. These and other features will become more fully apparent from the following description and appended claims, or may be learned by the practice of such embodiments as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which.

DETAILED DESCRIPTION

One or more specific embodiments of the present disclosure will be described below. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

This disclosure generally relates to devices, systems, and methods for fixing an ultrahard insert in a cutting bit. More particularly, the present disclosure relates to embodiments of cutting bits having a carbonate or other form of thermally stable PCD insert cast directly into a bit body, thereby increasing a rate of penetration of the cutting bit, reducing the likelihood of a cutting element and/or a bit body failure, or combinations thereof. While a drill bit for cutting through an earth formation is described herein, it should be understood that the present disclosure may be applicable to other cutting bits such as milling bits, reamers, hole openers, and other cutting bits, and through other materials, such as cement, concrete, metal, or formations including such materials.

Figure 1:
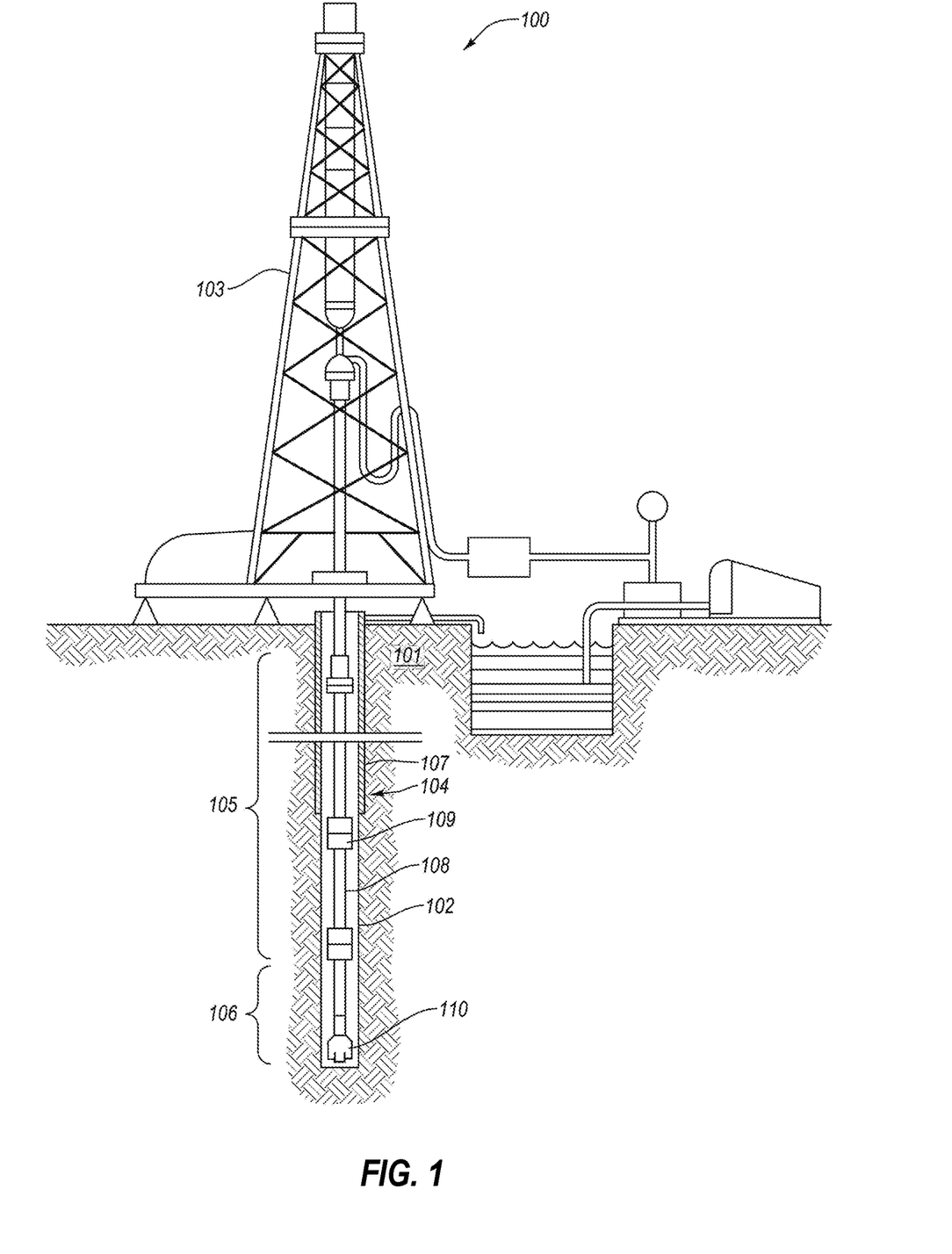
FIG. 1 is a schematic representation of an embodiment of a drilling system, according to the present disclosure.

FIG. 1 shows one example of a drilling system 100 for drilling an earth formation 101 to form a wellbore 102. The drilling system 100 includes a drill rig 103 used to turn a drilling tool assembly 104 which extends downward into the wellbore 102. The drilling tool assembly 104 may include a drill string 105, a bottomhole assembly ("BHA") 106, and a bit 110, attached to the downhole end of drill string 105.

The drill string 105 may include several joints of drill pipe 108 a connected end-to-end through tool joints 109. The drill string 105 transmits drilling fluid through a central bore and transmits rotational power from the drill rig 103 to the BHA 106. In some embodiments, the drill string 105 may further include additional components such as subs, pup joints, etc. The drill pipe 108 provides a hydraulic passage through which drilling fluid is pumped from the surface. The drilling fluid discharges through selected-size nozzles, jets, or other orifices in the bit 110 for the purposes of cooling the bit 110 and cutting structures thereon, and for lifting cuttings out of the wellbore 102 as it is being drilled.

The BHA 106 may include the bit 110 or other components. An example BHA 106 may include additional or other components (e.g., coupled between to the drill string 105 and the bit 110). Examples of additional BHA components include drill collars, stabilizers, measurement-while-drilling ("MWD") tools, logging-while-drilling ("LWD") tools, downhole motors, underreamers, section mills, hydraulic disconnects, jars, vibration or dampening tools, other components, or combinations of the foregoing.

In general, the drilling system 100 may include other drilling components and accessories, such as special valves (e.g., kelly cocks, blowout preventers, and safety valves). Additional components included in the drilling system 100 may be considered a part of the drilling tool assembly 104, the drill string 105, or a part of the BHA 106 depending on their locations in the drilling system 100.

The bit 110 in the BHA 106 may be any type of bit suitable for degrading downhole materials. For instance, the bit 110 may be a drill bit suitable for drilling the earth formation 101. Example types of drill bits used for drilling earth formations are fixed-cutter or drag bits (see FIG. 2). In other embodiments, the bit 110 may be a mill used for removing metal, composite, elastomer, other materials downhole, or combinations thereof. For instance, the bit 110 may be used with a whipstock to mill into casing 107 lining the wellbore 102. The bit 110 may also be a junk mill used to mill away tools, plugs, cement, other materials within the wellbore 102, or combinations thereof. Swarf or other cuttings formed by use of a mill may be lifted to surface, or may be allowed to fall downhole.

Figure 2:
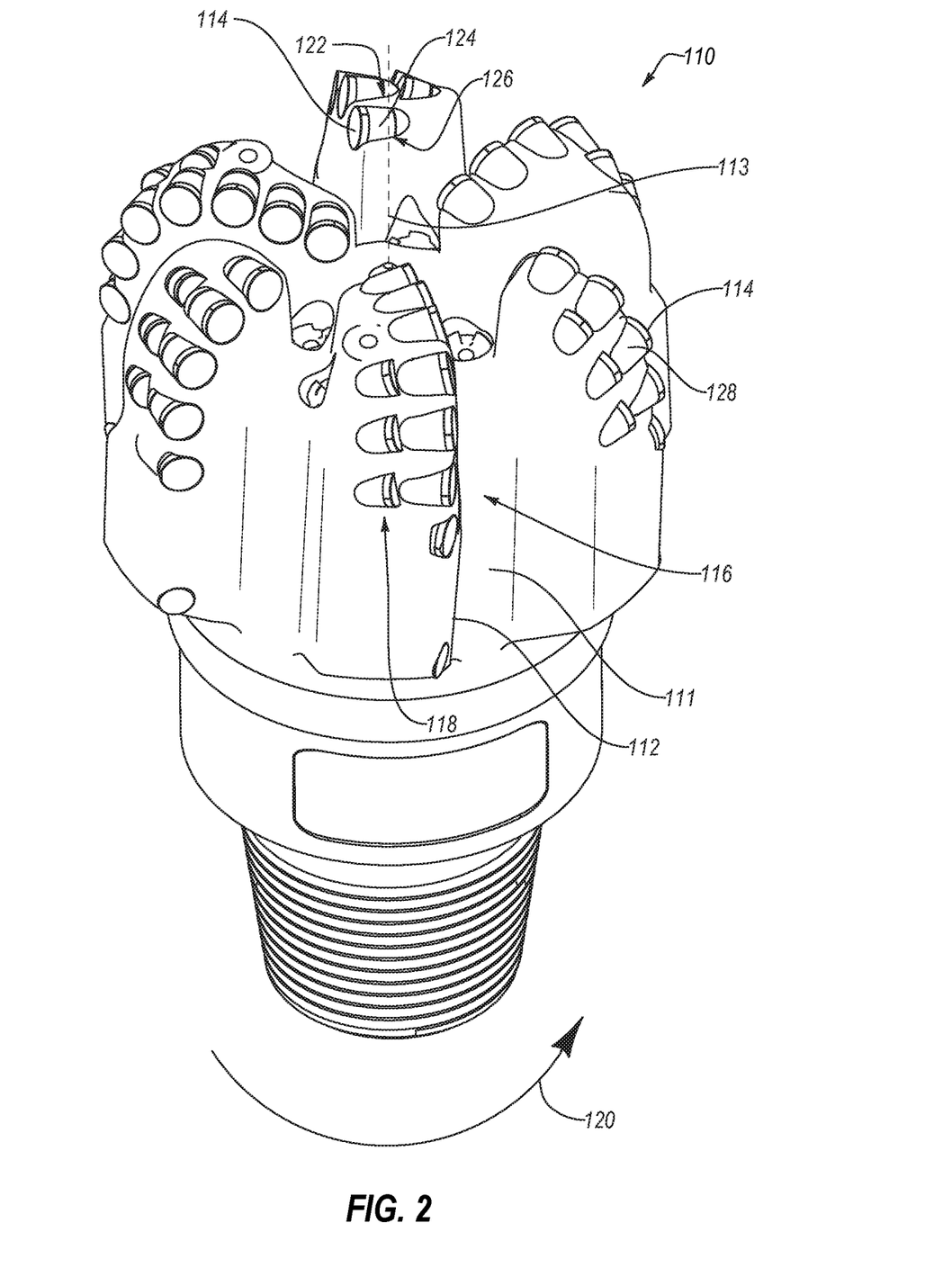
FIG. 2 is a perspective view of an embodiment of a bit having a plurality of inserts cast directly into the bit body, according to the present disclosure.

FIG. 2 is a perspective view of the embodiment of a bit 110 of the drilling system 100 of FIG. 1. In some embodiments, the bit 110 may include a body 111 with a plurality of blades 112 that extend radially away from a rotational axis 113 of the bit 110. In some embodiments, the bit 110 may have two, three, four, five, six, seven, eight, or more blades 112.

In some embodiments, the blades 112 may have one or more ultrahard inserts 114 affixed thereto. For example, at least one of the ultrahard inserts 114 may be positioned at a periphery of the blade 112 to allow the ultrahard insert 114 to remove material as the bit 110 rotates about the rotational axis 113. In some embodiments, at least one ultrahard insert 114 may be positioned in a first row 116, at the leading edge of the blade 112, and at least one ultrahard insert 114 may be positioned in a second row 118 behind the first row 116, relative to a direction of rotation 120 of the bit 110 about the rotational axis 113.

In some embodiments, the ultrahard insert 114 may include an ultrahard material. As used herein, the term "ultrahard" is understood to refer to those materials known in the art to have a grain hardness of about 1,500 HV (Vickers hardness in kg/mm$^2$) or greater. Such ultra-hard materials can include those capable of demonstrating physical stability at temperatures above about 750° C., and for certain applications above about 1,000° C., that are formed from consolidated materials. Such ultrahard materials can include but are not limited to diamond or polycrystalline diamond (PCD) including leached metal catalyst PCD, non-metal catalyst PCD, binderless PCD, nanopolycrystalline diamond (NPD), or hexagonal diamond (Lonsdaleite); cubic boron nitride (cBN); polycrystalline cBN (PcBN); Q-carbon; binderless PcBN; diamond-like carbon; boron suboxide; aluminum manganese boride; metal borides; boron carbon nitride; and other materials in the boron-nitrogen-carbon-oxygen system which have shown hardness values above 1,500 HV, oxide, nitride, carbide and boride ceramics and/or cermets, as well as combinations of the above materials. In at least one embodiment, the insert 114 may be a monolithic carbonate PCD. For example, the insert 114 may consist of a PCD compact without an attached substrate or metal catalyst phase. In some embodiments, the ultrahard material may have a hardness values above 3,000 HV. In other embodiments, the ultrahard material may have a hardness value above 4,000 HV. In yet other embodiments, the ultrahard material may have a hardness value greater than 80 HRa (Rockwell hardness A).

In some embodiments including a carbonate PCD, the ultrahard insert may be damaged by temperatures above a threshold temperature. For example, a carbonate PCD may be damaged by exposure to temperature greater than 2200° Fahrenheit (1204° Celsius). Such embodiments may, therefore, be damaged by brazing. Carbonate PCD inserts may be cast directly into a body 111 and/or blade 112 as the body 111 and/or blade 112 may be cast at a casting and/or sintering temperature lower than a brazing temperature.

In some embodiments, a bit 110 may include ultrahard inserts 114 that cast directly into a blade 112 and ultrahard inserts 114 that part of a cutting element 122 along with a matrix 124. The cutting element 122 may be brazed into a pocket 126 in a blade 112. In other embodiments, a bit 110 may include only ultrahard inserts 114 cast directly into the body 111 and/or blade(s) 112 of the bit.

The ultrahard inserts 114 that are cast directly into the body 111 and/or blade(s) 112 may be supported by a backing 128 positioned behind the ultrahard insert 114. In some embodiments, the backing 128 may be integrally formed with the body 111 and/or blade 112 of the bit 110. For example, the backing 128 may be cast as contiguous material with the body 111 and/or blade 112. In other examples, the backing 128 may be part of a block or billet of material that is machined to form the body 111 and/or blade 112. In yet other examples, the backing 128 may be sintered integrally with the body 111 and/or blade 112 during additive manufacturing.

In other embodiments, the backing 128 may be formed separately from the body 111 and/or blade 112 and inserted into a pocket 126. For example, a conventional bit with pockets for cutting elements may have a carbide powder positioned in the pocket with an ultrahard insert, and the carbide powder may be sintered to form the backing 128 and secure the ultrahard insert in the pocket.

Figure 3:
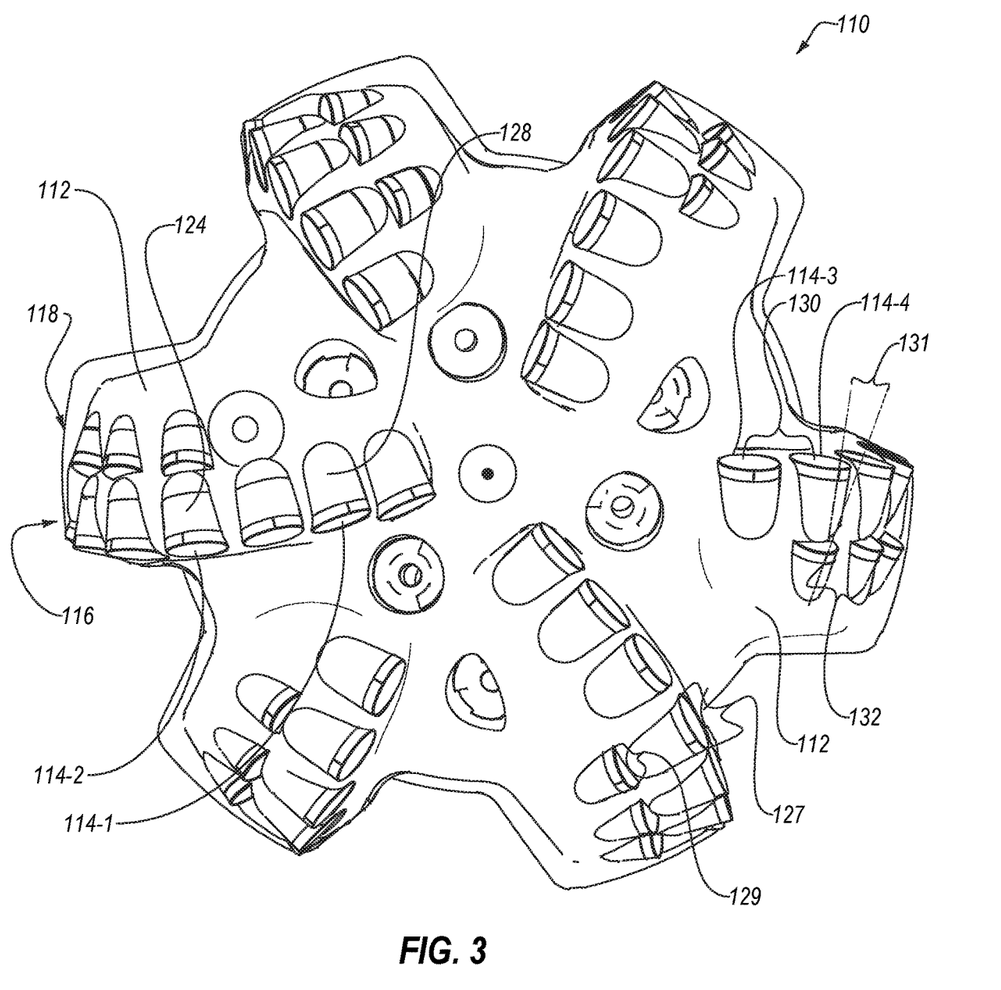
FIG. 3 is an end view of the embodiment of a bit of FIG. 2, according to the present disclosure.

FIG. 3 is an end view of the embodiment of a bit 110 of FIG. 2. As shown in FIG. 3, in some embodiments, a bit 110 may have a first ultrahard insert 114-1 that is cast directly into the bit 110 contacting a backing 128, and the bit 110 may have a second ultrahard insert 114-2 affixed to a matrix 124 that is secured in a pocket. In some embodiments, the cutting element with the second ultrahard insert 114-2 and matrix 124 may be replaceable, such that high wear portions of the bit 110 (e.g., a shoulder region) are repairable. In other embodiments, a bit 110 may have one or more ultrahard inserts cast directly in the bit 110 (such as the first ultrahard insert 114-1) in the first row 116 only or the second row only 118. In yet other embodiments, a bit may have one or more ultrahard inserts with a matrix (such as the second ultrahard insert 114-2 and matrix 124) in the first row 116 only or the second row only 118.

In some embodiments, the ultrahard inserts that are cast directly into the blade 112, such as the third and fourth ultrahard inserts 114-3, 114-4 of FIG. 3, may be spaced apart by an amount at least partially related to a diameter 127 of the ultrahard insert. For example, the first row spacing 130 may be related to the diameter 127 by a first row ratio of the nominal distance between the centerpoints to the diameter 127 of the third and fourth ultrahard inserts 114-3, 114-4. In some embodiments, the first row ratio may be in a range having an upper value, a lower value, or upper and lower values including any of 1.1, 1.2, 1.3, 1.4, 1.5, 1.6, 1.7, 1.8, 1.9, 2.0, or any values therebetween or greater than 2.0. For example, the first row ratio may be greater than 1.1. In other examples, the first row ratio may be less than 2.0. In yet other examples, the first row ratio may be between 1.1 and 2.0. In further examples, the first row ratio may be between 1.2 and 1.8. In at least one example, the first row ratio may be about 1.5.

In some embodiments, the second row 118 of ultrahard inserts may have a second row spacing 132. For example, the second row spacing 132 may be related to the diameter 129 of the ultrahard inserts of the second row 118 by a second row ratio of the nominal distance between the centerpoints to the diameter 129 of the ultrahard inserts. In some embodiments, the second row ratio may be in a range having an upper value, a lower value, or upper and lower values including any of 1.1, 1.2, 1.3, 1.4, 1.5, 1.6, 1.7, 1.8, 1.9, 2.0, or any values therebetween. For example, the second row ratio may be greater than 1.1. In other examples, the second row ratio may be less than 2.0. In yet other examples, the second row ratio may be between 1.1 and 2.0. In further examples, the second row ratio may be between 1.2 and 1.8. In at least one example, the second row ratio may be about 1.5.

In some embodiments, the first row spacing 130 and second row spacing 132 may be equal. In other embodiments, the first row spacing 130 and second row spacing 132 may be different. In some embodiments, the first row ratio and second row ratio may be equal. In other embodiments, the first row ratio and second row ratio may be different.

In some embodiments, the ultrahard inserts of the first row 116 and the ultrahard inserts of the second row 118 on a blade 112 may be substantially aligned in the rotational direction 120. In other embodiments, at least one ultrahard insert of the first row 116 and at least one of the ultrahard insert of the second row 118 may be radially displaced relative to one another such that a cutting path of the ultrahard insert of the first row 116 and the ultrahard insert of the second row 118 are different. For example, the radial displacement 131 between an ultrahard insert of the first row 116 and an ultrahard insert of the second row 118 may be related to a diameter 127 of the ultrahard insert of the first row 116 by a radial displacement ratio (i.e., the radial displacement 131 to diameter 127 of the ultrahard insert).

In some embodiments, the radial displacement ratio may be in a range having an upper value, a lower value, or upper and lower values including any of 0.1, 0.2, 0.3, 0.4, 0.5, 0.6, 0.7, 0.8, 0.9, 1.0, or any values therebetween. For example, the radial displacement ratio may be greater than 0.1. In other examples, the radial displacement ratio may be less than 1.0. In yet other examples, the radial displacement ratio may be between 0.1 and 1.0. In further examples, the radial displacement ratio may be between 0.25 and 0.75. In at least one example, the radial displacement ratio may be about 0.5.

Figure 4:
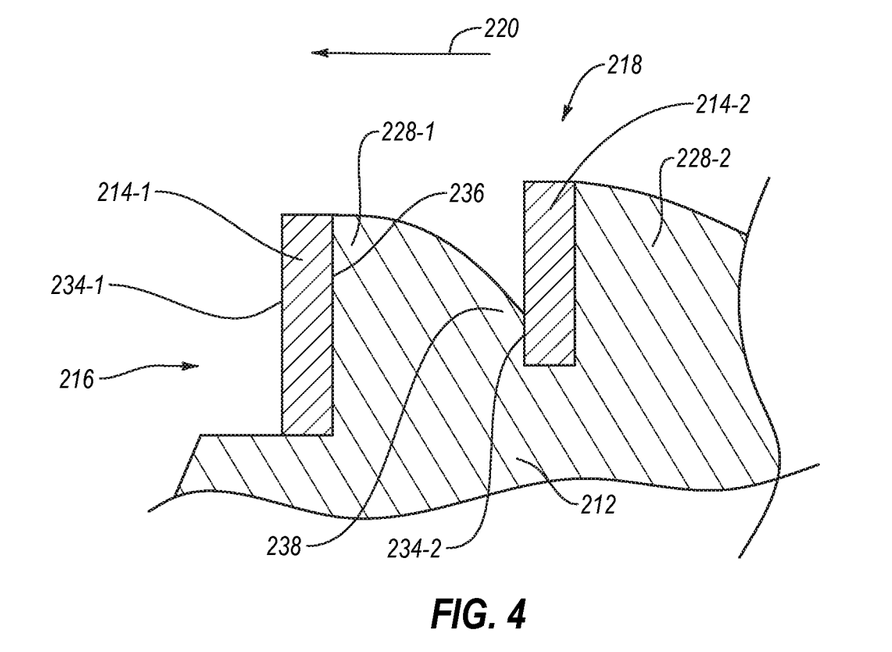
FIG. 4 is a side cross-sectional view of an embodiment of a plurality of rows of inserts cast directly into a bit body, according to the present disclosure.

FIG. 4 illustrates an embodiment of a blade 212 having a first row 216 and second row 218 of ultrahard inserts cast directly into the blade 212. In some embodiments, a first ultrahard insert 214-1 may be positioned in a first row 216 and adjacent a first backing 228-1 and a second ultrahard insert 214-2 may be positioned in a second row 218 adjacent a second backing 228-2.

A front face 234-1 of the first ultrahard insert 214-1 may be oriented in the rotational direction 220 of the blade 212. In some embodiments, the front face 234-1 of the first ultrahard insert 214-1 may be fully exposed. For example, no portion of the front face 234-1 of the first ultrahard insert 214-1 is covered by the blade 212 or other material.

A rear face 236 of the first ultrahard insert 214-1 may be oriented substantially opposite the front face 234-1 and toward the second row 218. In some embodiments, the rear face 236 may be adjacent to and/or directly contacting the first backing 228-1. For example, the first backing 228-1 may contact the entire rear face 236 of the first ultrahard insert 214-1 to support the first ultrahard insert 214-1 when removing material during operations.

In some embodiments, a thickness of the ultrahard insert 214-1, 214-2 (i.e., the distance between the front face 234-1 and the rear face 236) may be in a range having an upper value, a lower value, or upper and lower values including any of 0.100 inches (2.54 millimeters), 0.120 inches (3.05 mm), 0.140 inches (3.56 mm), 0.160 inches (4.06 mm), 0.180 inches (4.57 mm), 0.200 inches (6.08 mm), 0.300 inches (8.62 mm), 0.400 inches (10.16 mm), 0.500 inches (12.7 mm), or any values therebetween. For example, the thickness of the ultrahard insert 214-1, 214-2 may be greater than 0.100 inches (2.54 mm). In other examples, the thickness of the ultrahard insert 214-1, 214-2 may be less than 0.500 inches (12.7 mm). In yet other examples, the thickness of the ultrahard insert 214-1, 214-2 may be between 0.100 inches (2.54 mm) and 0.500 inches (12.7 mm). In further examples, the thickness of the ultrahard insert 214-1, 214-2 may be between 0.120 inches (3.05 mm) and 0.400 inches (10.16 mm). In yet further examples, the thickness of the ultrahard insert 214-1, 214-2 may be between 0.140 inches (3.56 mm) and 0.300 inches (8.62 mm). In at least one example, the thickness of the ultrahard insert 214-1, 214-2 may be about 0.150 inches (3.81 mm).

A front face 234-2 of the second ultrahard insert 214-2 may be oriented in the rotational direction 220 of the blade 212. In some embodiments, the front face 234-2 of the second ultrahard insert 214-2 may be fully exposed. In other embodiments, at least part of the front face 234-2 of the second ultrahard insert 214-2 may be covered by a front block 238. In some embodiments, a portion of the front face 234-2 of the second ultrahard insert 214-2 covered by a front block 238 may be in a range having an upper value, a lower value, or upper and lower values including any of 0%, 10%, 20%, 30%, 40%, 50%, 60%, 70%, 80%, or any values therebetween. For example, the portion of the front face 234-2 of the second ultrahard insert 214-2 covered by a front block 238 may be greater than 0%. In other examples, the portion of the front face 234-2 of the second ultrahard insert 214-2 covered by a front block 238 may be less than 80%. In yet other examples, the portion of the front face 234-2 of the second ultrahard insert 214-2 covered by a front block 238 may be between 0% and 80%. In further examples, the portion of the front face 234-2 of the second ultrahard insert 214-2 covered by a front block 238 may be between 10% and 70%. In still further examples, the portion of the front face 234-2 of the second ultrahard insert 214-2 covered by a front block 238 may be between 20% and 60%.

In some embodiments, the front block 238 may provide additional support and/or retention of the ultrahard insert 214-2 in the blade 212. In at least one embodiment, the front block 238 may be integrally formed with the blade 212. In other embodiments, the front block 238 may be affixed to the blade 212 by brazing, welding, mechanical fasteners, adhesives, or combinations thereof.

Figure 5:
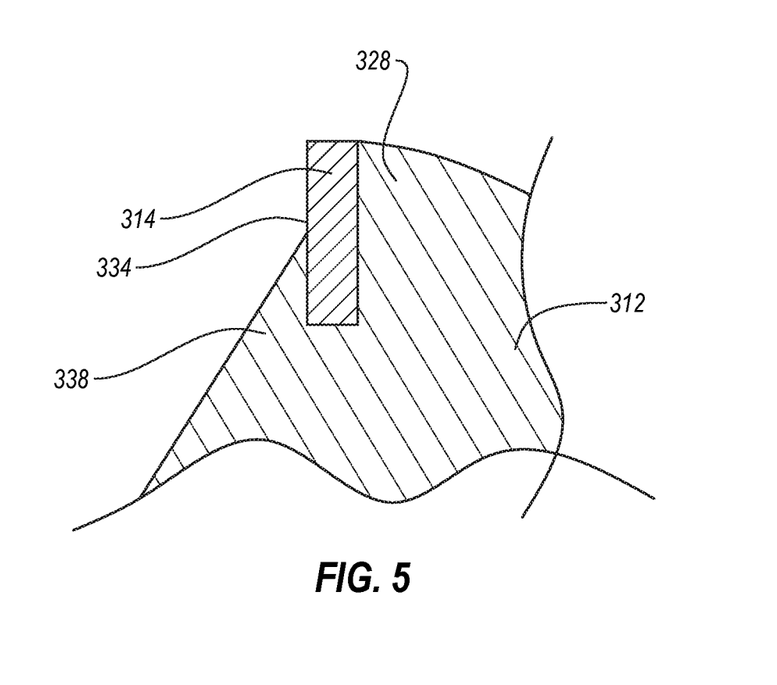
FIG. 5 is a side cross-sectional view of an embodiment of an insert cast directly into a bit body, according to the present disclosure.

FIG. 5 is a side cross-sectional view of an embodiment of a ultrahard insert 314 positioned in a first row 316 of a blade 312. In some embodiments, an ultrahard insert 314 in the first row 316 may have a front face 334 that is partially covered by a front block 338. For example, the front block 338 may provide additional support and/or retention to the ultrahard insert 314 in the front row 316. As described in relation to FIG. 4, in some embodiments, the front block 338 may be integrally formed with the blade 312. In other embodiments, the front block 338 may be affixed to the blade 312 by brazing, welding, mechanical fasteners, adhesives, or combinations thereof.

In some embodiments, the portion of the front face 334 covered by a front block 338 may be in a range having an upper value, a lower value, or upper and lower values including any of 0%, 10%, 20%, 30%, 40%, 50%, 60%, 70%, 80%, or any values therebetween. For example, the portion of the front face 334 covered by a front block 338 may be greater than 0%. In other examples, the portion of the front face 334 covered by a front block 338 covered by a front block 238 may be less than 80%. In yet other examples, the portion of the front face 334 covered by a front block 338 may be between 0% and 80%. In further examples, the portion of the front face 334 covered by a front block 338 may be between 10% and 70%. In still further examples, the portion of the front face 334 covered by a front block 338 may be between 20% and 60%.

Figure 6:
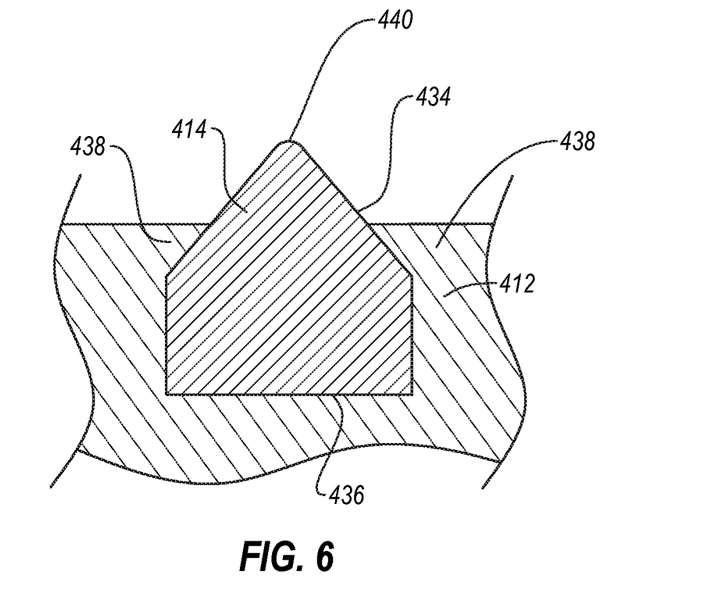
FIG. 6 is a transverse cross-sectional view of another embodiment of an insert cast directly into a bit body, according to the present disclosure.

In other embodiments, an ultrahard insert may have a three-dimensional (3D) front face. FIG. 6 is a transverse cross-sectional view of an embodiment of an ultrahard insert 414 with a 3D front face 434 including. In some embodiments, the 3D front face 434 may be apexed with an apex 440 or peak on the front face 434 relative to a rear face 436 of the ultrahard insert 436 contacting the blade 412. In other embodiments, at least a portion of the 3D front face 434 may be raised, curved, angled, or irregular relative to the rear face 436. For example, a 3D front face 434 may be generally convex away from the remainder of the ultrahard insert 414. In other examples, a 3D front face 434 may be trapezoidal away from the remainder of the ultrahard insert 414. In yet other examples, a 3D front face 434 may be generally conical or frustoconical away from the remainder of the ultrahard insert 414. In further examples, a 3D front face 434 may be ridged (i.e., have a transversely elongated peak 440) away from the remainder of the ultrahard insert 414.

In some embodiments, a 3D front face 434 may allow for a planar surface of the blade 412 to cover a portion of the front face 434 and provide additional support and/or retention to the ultrahard insert 414. For example, a front block 438 may cover a portion of transversely opposing sides of the front face 434.

Figure 7:
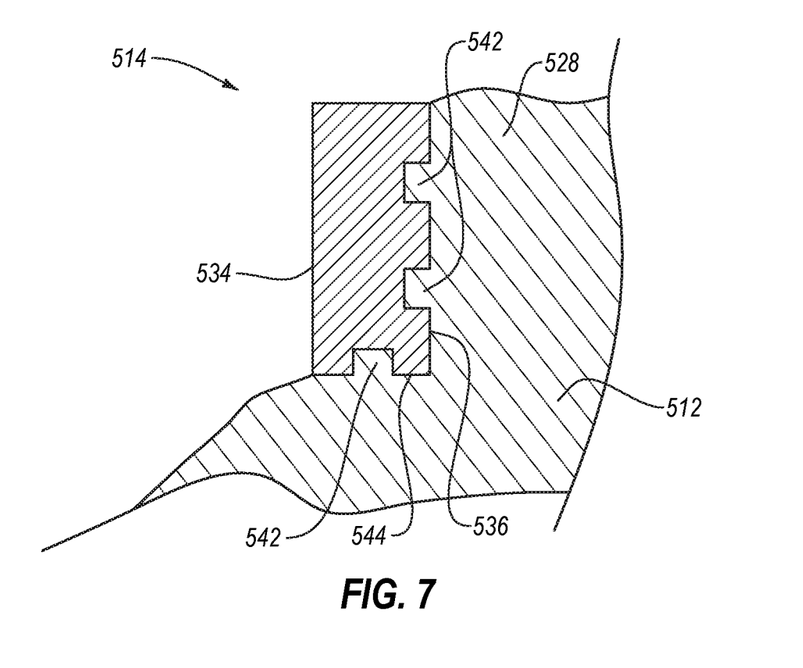
FIG. 7 is a side cross-sectional view of yet another embodiment of an insert cast directly into a bit body, according to the present disclosure.

In some embodiments, an ultrahard insert may have one or more mechanical interlock features to provide additional support and/or retention between the ultrahard insert and a blade. FIG. 7 illustrates another embodiment of an ultrahard insert 514 cast directly into a blade 512. In some embodiments, the ultrahard insert 514 may have one or more mechanical interlock features 542 in a rear face 536 and/or sidewall 544 of the ultrahard insert 514. For example, one or more mechanical interlock features 542 in a rear face 536 of the ultrahard insert 514 may interlock with complimentary portions of the backing 528 and/or other portions of the blade 512. In other embodiments with a front block, an ultrahard insert 514 may have one or more mechanical interlock features 542 on a front face 534.

In some embodiments, a mechanical interlock feature 542 may be a recess, groove, post, dovetail, dimple, or other relief feature on the ultrahard insert 514. When positioned adjacent to and/or in contact with a precursor material of the bit body and/or blade 512 (e.g., a powder, metal alloy, epoxy, gel, other fluid, or combinations thereof), the precursor material may complimentarily form with the mechanical interlock feature 542. Upon curing of the precursor material, the ultrahard insert and the bit body and/or blade 512 may become mechanically interlocked. In some embodiments, the curing of the precursor material to a solid body may occur at an elevated temperature (e.g., between 1112° Fahrenheit (600° Celsius) and 2192° Fahrenheit (1200° Celsius)) and the material of the bit body and/or blade 512 may have a greater coefficient of thermal expansion than the ultrahard material. The thermal compression of the bit body and/or blade 512 during cooling from the curing process may apply a compressive force to the ultrahard insert, thereby compressing the ultrahard insert in the bit body and/or blade 512.

Figure 8:
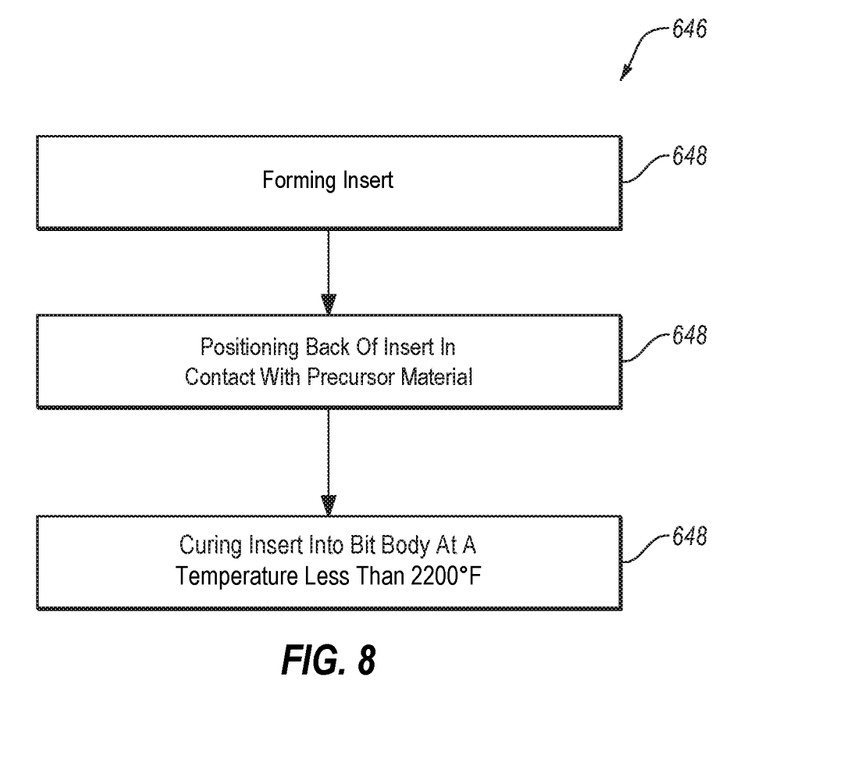
FIG. 8 is a flowchart illustrating an embodiment of a method of manufacturing a drill bit, according to the present disclosure.

FIG. 8 is a flowchart illustrating an embodiment of a method 646 of manufacturing a bit with one or more ultrahard inserts cast directly into the bit. The method includes forming an ultrahard insert at 648. Forming the insert may include sintering the insert in a high temperature high pressure press. In some embodiments, the ultrahard insert may be sintered with a carbonate catalyst. In embodiments with a carbonate catalyst, the insert may be sintered in a pressure range of 6 Gigapascal to 10 Gigapascal and a temperature range of 2732° Fahrenheit (1500° Celsius) to 4532° Fahrenheit (2500° Celsius). For example, the insert may include a PCD having a magnesium carbonate catalyst. In some embodiments, the binder may be at least partially leached from the insert. In other embodiments, the binder may be at least decomposed at an elevated temperature. For example, a PCD with a magnesium carbonate catalyst may have at least some of the magnesium carbonate decomposed into carbon monoxide and/or carbon dioxide by heating the insert to a temperature of more than 932° Fahrenheit (500° Celsius).

In some embodiments, at least 50% of the binder material may be removed from the ultrahard material after forming the insert. In other embodiments, at least 80% of the binder material may be removed from the ultrahard material after forming the insert. In yet other embodiments, substantially all of the binder material may be removed from the ultrahard material after forming the insert. In yet further embodiments, less than 5% of the binder material may be removed from the ultrahard material after forming the insert.

In some embodiments, the forming the ultrahard insert may further include shaping the ultrahard insert. For example, the ultrahard insert may be cut or machined to a final shape or one or more mechanical interlock features may be formed in the insert. The ultrahard insert may be shaped by removing material by grinding, laser ablation, mechanical cutting, hydrojet cutting, electrical discharge machining, other material removal techniques or combinations thereof.

After forming the ultrahard insert, the method 646 may further include positioning the ultrahard insert adjacent to and/or in contact with a precursor material in a bit body mold. For example, the ultrahard inserts may be positioned in a mold and a precursor material (e.g., a powder, metal alloy, epoxy, gel, other fluid, or combinations thereof) may be positioned in the mold to fill space in the mold contacting and/or surrounding at least a portion of the ultrahard inserts. The precursor material may become the bit body and/or blades upon curing the precursor material into the bit body material.

In some embodiments, the precursor material may include or be made of a tungsten carbide powder. In other embodiments, the precursor material may include or be made of another carbide powder. In yet other embodiments, the precursor material may include or be made of a metal. In further embodiments, the first precursor material may include or be made of a material in a suspension or mixed with a fluid substrate. In yet further embodiments, the precursor material may include a diamond grit to impregnate the bit body and/or blades with diamond grains to improve wear resistance of the body and/or blades. In at least one embodiment, the precursor material may include a low melting point (i.e., less than 2200° Fahrenheit (1204° Celsius)) binder alloy to cast the body and/or blades with the ultrahard inserts.

The method 646 may further include curing the ultrahard insert into the bit body and/or blade at a temperature of no higher than 2200° Fahrenheit (1204° Celsius). Curing the precursor material to affix the ultrahard insert may include heating the precursor material to an elevated temperature. A curing temperature less than 2200° Fahrenheit (1204° Celsius) may limit damage to carbonate PCDs, increasing the operational lifetime of the carbonate PCD and, hence, the operational lifetime of the bit. In some embodiments, the curing temperature may be less than 1900° Fahrenheit (1037° Celsius). In other embodiments, the curing temperature may be less than 1700° Fahrenheit (927° Celsius). In yet other embodiments, the curing temperature may be less than 1500° Fahrenheit (816° Celsius).

Casting the bit body and/or blades at an elevated temperature may bind the ultrahard inserts to the material of the bit body and/or blades. Additionally, as described herein, upon cooling of the cast bit body and blades the relative thermal contraction of the ultrahard inserts and the material of the bit body and/or blades may assist in supporting and/or retaining the ultrahard inserts in the bit. The ultrahard inserts may thereby be cast directly into the bit.

In some embodiments, casting the ultrahard inserts directly into the bit body and/or blades may improve thermal conduction between the ultrahard inserts and the bit body and/or blades. The improved thermal conduction may allow for greater dissipation of thermal energy from the cutting areas of the ultrahard inserts and reduce thermal damage to the ultrahard inserts.

Figure 9A:
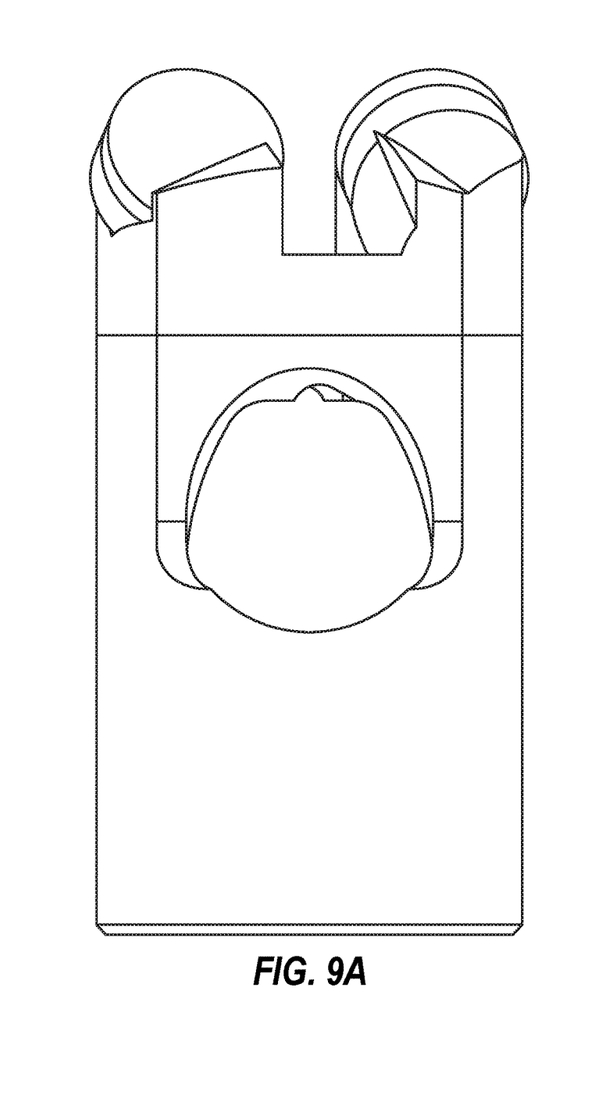
FIGS. 9*a* and 9*b* are alternate side perspective views of an embodiment of a cutting bit with a minimal number of ultrahard cutting elements per blade.
Figure 9B:
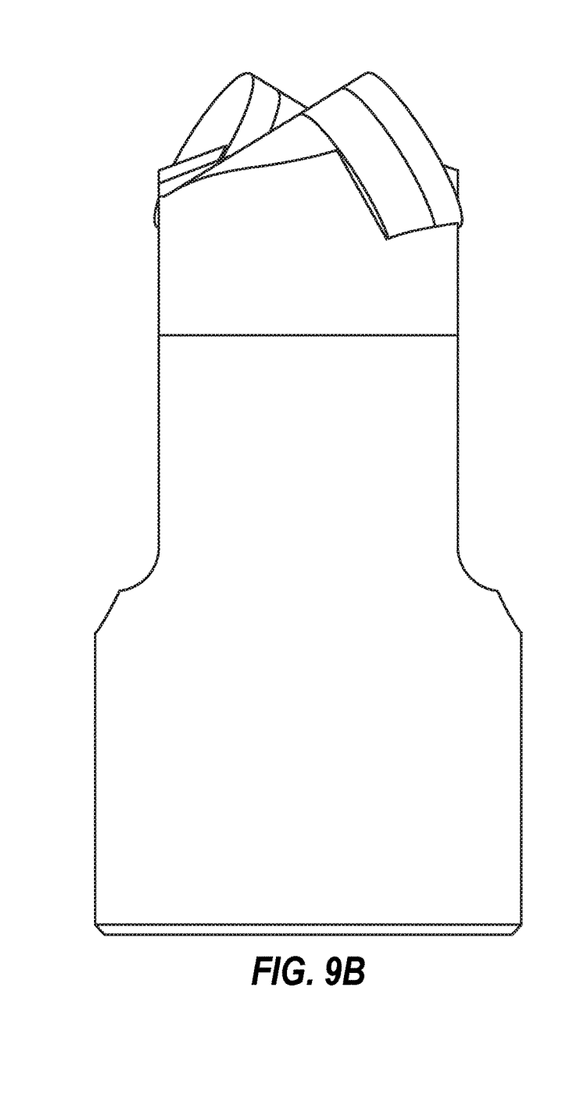
Figure 9C:
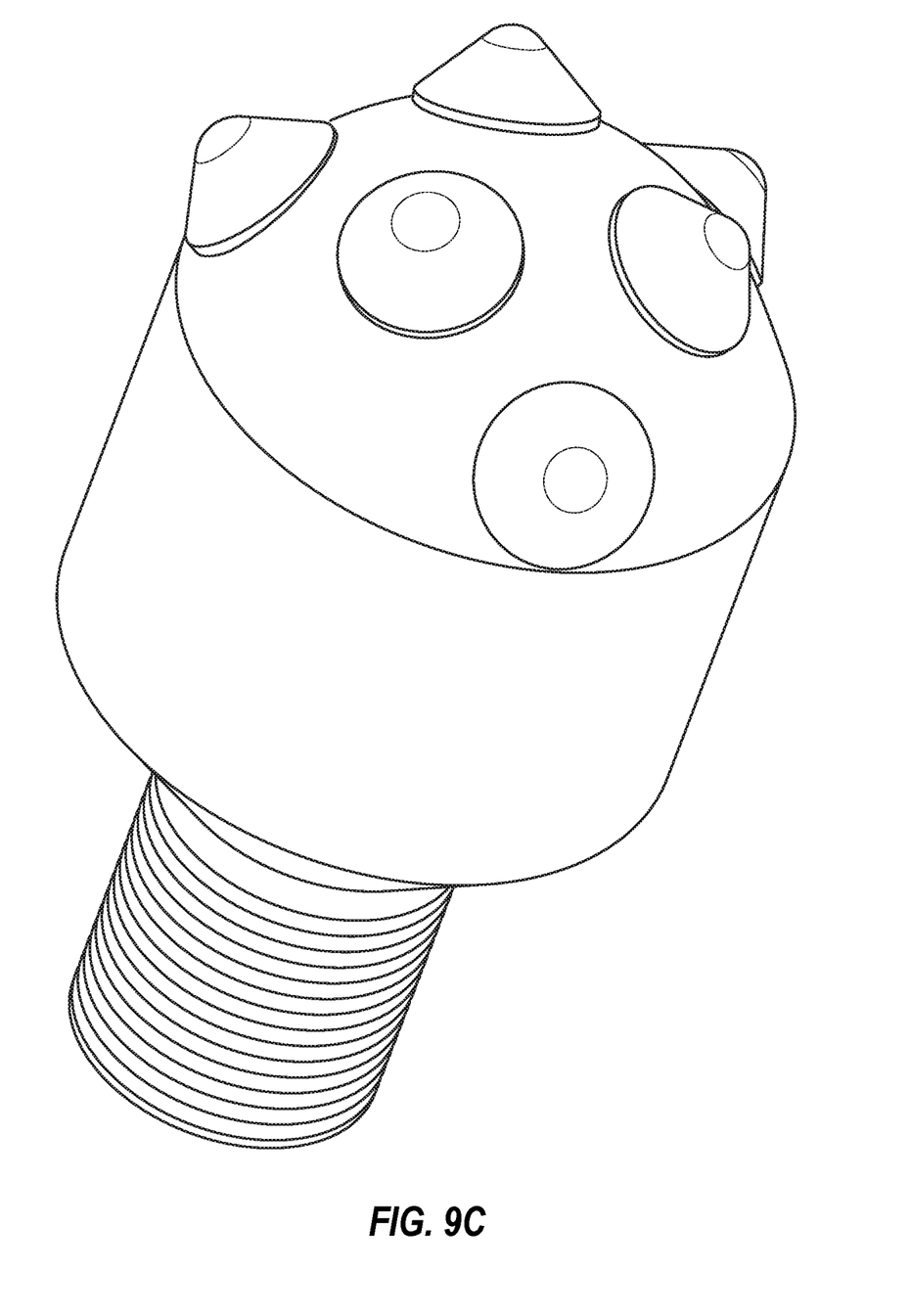
FIG. 9*c* is a side perspective view of a drilling tool incorporating conical elements, according to an embodiment.

While many bit designs may require multiple cutting elements per blade, other concepts may require a minimum number of cutting elements because of cost or size constraints. FIG. 9A and FIG. 9B show an embodiment of a cutting bit with a minimal number of ultrahard cutting elements per blade which may be employed for smaller diameter holes, such as those used in roof bolting or blast hole drilling in mining operations. In this embodiment, a two-bladed cutter with only one cutter per blade is shown. A similar bit could be manufactured with between three and six blades. Additionally, a drill bit with a single ultrahard cutting element located at the center of the bit could be fabricated using the casting technique as well. FIG. 9C shows a bit that is constructed using conical elements described in relation to FIG. 6.

While embodiments of bits and ultrahard inserts have been primarily described with reference to wellbore drilling operations, the bits and ultrahard inserts described herein may be used in applications other than the drilling of a wellbore. In other embodiments, bits and ultrahard inserts according to the present disclosure may be used outside a wellbore or other downhole environment used for the exploration or production of natural resources. For instance, bits and ultrahard inserts of the present disclosure may be used in a borehole used for placement of utility lines. In other examples, bits and ultrahard inserts of the present disclosure may be used in wireline applications and/or maintenance applications. Accordingly, the terms "wellbore," "borehole," and the like should not be interpreted to limit tools, systems, assemblies, or methods of the present disclosure to any particular industry, field, or environment.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. It should be understood that any directions or reference frames in the preceding description are merely relative directions or movements. For example, any references to "up" and "down" or "above" and "below" are merely descriptive of the relative position or movement of the related elements. Any element described in relation to an embodiment or a figure herein may be combinable with any element of any other embodiment or figure described herein.

Any element described in relation to an embodiment or a figure herein may be combinable with any element of any other embodiment or figure described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

We claim:

1. A device for removing material, the device comprising:
   a bit body having a plurality of blades and a rotational axis;
   a first polycrystalline diamond (PCD) insert cast directly into a first row of a first blade of the plurality of blades the first PCD insert including a front face that is fully exposed in the first blade and a second face adjacent to the front face, the second face being fully exposed in the first blade;
   a backing at least partially supporting the first PCD insert; and
   a second PCD insert cast directly into a second row of the first blade, the second row being positioned behind the first row relative to a direction of rotation of the bit body about the rotational axis, the second PCD insert adjacent to the backing, the second PCD insert having a front face, at least part of the second PCD insert front face being exposed in the first blade.

2. The device of claim 1, at least one of the first PCD insert or the second PCD insert having a carbonate catalyst.

3. The device of claim 1, at least one of the first PCD insert or the second PCD insert having a three-dimensional front face.

4. The device of claim 1, the second PCD insert front face being at least partially covered by a portion of the first blade.

5. The device of claim 1, the second PCD insert being aligned with the first PCD insert in the direction of rotation.

6. The device of claim 1, the second PCD insert being radially displaced relative to the first PCD insert by a radial displacement ratio of 0.5, wherein the radial displacement ratio is a ratio of the radial displacement of the second PCD insert to a diameter of the first PCD insert.

7. The device of claim 1, the first row having a third PCD insert adjacent the first PCD insert, a first row spacing between the first PCD insert and third PCD insert being related to a diameter of the first PCD insert by a first row ratio between 1.1 and 2.0.

8. The device of claim 1, the second row having a fourth PCD insert adjacent the second PCD insert, a second row spacing between the second PCD insert and fourth PCD insert being related to a diameter of the second PCD insert by a first row ratio between 1.1 and 2.0.

9. A method of manufacturing a bit, the method comprising:
   forming a polycrystalline diamond (PCD) insert;
   positioning a rear surface of the PCD insert in contact with a precursor material in a bit body mold, the precursor material surrounding a mechanical interlock of the PCD insert; and
   curing the precursor material at a curing temperature no higher than 1700° F. (927° C.) to form a bit body and at least one blade, wherein the PCD insert is cast directly into the at least one blade.

10. The method of claim 9, forming the PCD insert including sintering the PCD insert with a carbonate binder at an elevated temperature.

11. The method of claim 10, further comprising decomposing at least part of the carbonate binder.

12. The method of claim 11, decomposing at least part of the carbonate binder including heating the PCD insert to a temperature of more than 932° F. (500° C.).

13. The method of claim 9, the precursor material including diamond grit.

* * * * *